United States Patent
Hunter (10) Patent No.: US 8,068,119 B2
(45) Date of Patent: *Nov. 29, 2011

(54) SYSTEM AND METHOD FOR MULTI-SAMPLING PRIMITIVES TO REDUCE ALIASING

(75) Inventor: Kevin Hunter, Sunnyvale, CA (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,146

(22) Filed: Feb. 18, 2010

(65) Prior Publication Data

US 2010/0141677 A1    Jun. 10, 2010

Related U.S. Application Data (63) Continuation of application No. 11/417,387, filed on May 3, 2006, now Pat. No. 7,675,526, which is a continuation of application No. 09/945,367, filed on Aug. 31, 2001, now Pat. No. 7,145,577.

(51) Int. Cl.
*G09G 5/02* (2006.01)
*G09G 5/39* (2006.01)

(52) U.S. Cl. ............................................. 345/613

(58) Field of Classification Search ............... 345/613
See application file for complete search history.

(56) References Cited

U.S. PATENT DOCUMENTS

| | | | | |
|---|---|---|---|---|
| 5,307,450 A | 4/1994 | Grossman | | 395/123 |
| 5,701,405 A | 12/1997 | Kelley et al. | | 395/141 |
| 5,867,166 A | * 2/1999 | Myhrvold et al. | | 345/419 |
| 5,959,598 A | 9/1999 | McKnight | | 345/90 |
| 5,990,904 A | 11/1999 | Griffin | | 345/435 |
| 6,038,031 A | 3/2000 | Murphy | | 358/1.09 |
| 6,108,460 A | 8/2000 | Rich | | 382/304 |
| 6,133,901 A | 10/2000 | Law | | 345/136 |
| 6,249,287 B1 | 6/2001 | Yamrom | | 345/419 |
| 6,252,608 B1 | 6/2001 | Snyder et al. | | 345/473 |
| 6,259,457 B1 | 7/2001 | Davies et al. | | 345/435 |
| 6,278,434 B1 * | 8/2001 | Hill et al. | | 345/660 |
| 6,300,956 B1 | 10/2001 | Apodaca et al. | | 345/433 |
| 6,313,838 B1 | 11/2001 | Deering | | 345/420 |
| 6,326,964 B1 | 12/2001 | Snyder et al. | | 345/419 |
| 6,438,266 B1 | 8/2002 | Bajaj et al. | | |
| 6,459,428 B1 | 10/2002 | Burk et al. | | 345/419 |
| 6,496,186 B1 | 12/2002 | Deering | | 345/419 |
| 6,496,187 B1 | 12/2002 | Deering et al. | | 345/419 |

(Continued)

OTHER PUBLICATIONS

Abrash, M., "Inside Xbox Graphics", Dr. Dobb's Journal: Software Tools for the Professional Programmer, vol. 25, No. 8, Aug. 2000, pp. 21-26.

(Continued)

*Primary Examiner* — Javid A Amini (74) *Attorney, Agent, or Firm* — Lerner, David, Littenberg, Krumholz & Mentlik, LLP (57) ABSTRACT

A method and system for performing multi-sample, anti-aliased rendering of images by performing multi-sample anti-aliasing at the primitive level. Geometric primitives used to represent a graphics environment are set-up, and then shifted by a sub-pixel offset and rendered to generate values for pixels of an intermediate image. The shifting and rendering is repeated for the geometric primitive, each time generating values for pixels of another intermediate image. The values for the pixels of the intermediate images are combined to produce values for the respective pixels of the resulting image.

23 Claims, 4 Drawing Sheets

U.S. PATENT DOCUMENTS

| | | | |
|---|---|---|---|
| 6,501,483 B1 | 12/2002 | Wong et al. | 345/611 |
| 6,556,197 B1 | 4/2003 | Van Hook et al. | 345/419 |
| 6,577,317 B1 | 6/2003 | Duluk, Jr. et al. | |
| 6,650,323 B2 | 11/2003 | Naegle et al. | 345/419 |
| 6,664,955 B1 | 12/2003 | Deering | 345/418 |
| 6,697,063 B1 | 2/2004 | Zhu | 345/421 |
| 6,717,576 B1 | 4/2004 | Duluk, Jr. et al. | |
| 6,720,975 B1 | 4/2004 | Dietrich, Jr. | 345/611 |
| 6,731,300 B2 | 5/2004 | Ramani et al. | 345/611 |
| 6,731,301 B2 | 5/2004 | Sato et al. | 345/613 |
| 6,781,585 B2 | 8/2004 | Naegle et al. | 345/501 |
| 6,825,847 B1 | 11/2004 | Molnar et al. | 345/555 |
| 6,828,983 B1 | 12/2004 | Vijayakumar et al. | 345/613 |
| 6,922,199 B2 | 7/2005 | Hunter | 345/611 |
| 6,999,100 B1 | 2/2006 | Leather et al. | 345/611 |
| 7,050,068 B1 | 5/2006 | Bastos et al. | 345/613 |
| 7,071,949 B1 | 7/2006 | Brucker et al. | 345/582 |
| 7,119,812 B2 | 10/2006 | Hunter | 345/582 |
| 7,145,577 B2 | 12/2006 | Hunter | 345/613 |
| 7,205,996 B2 | 4/2007 | Hunter | 345/582 |
| 7,369,138 B2 | 5/2008 | Hunter | 345/582 |
| 2001/0030650 A1 | 10/2001 | Sato et al. | 345/581 |
| 2002/0140706 A1 | 10/2002 | Peterson et al. | 345/611 |
| 2004/0207634 A1 | 10/2004 | Hunter | |
| 2004/0217973 A1 | 11/2004 | Hunter | |
| 2006/0197778 A1 | 9/2006 | Peterson et al. | 345/611 |
| 2006/0203005 A1 | 9/2006 | Hunter | 345/611 |
| 2008/0186329 A1 | 8/2008 | Hunter | 345/611 |

OTHER PUBLICATIONS

Author Unknown, "BB Scunthorpe—Four Queens Busy", Steel Times, vol. 223, No. 2, Feb. 1995, pp. 70-71.

Beets, Kristof et al., "Super-sampling Anti-aliasing Analyzed", Beyond3D, (2000) pp. 1-22, <http://www.Beyond3D.com>.

Bowers, G., "Reconstruction and Repair of Blast Furnaces", Metal Construction and British Welding Journal, Aug. 1970, pp. 317-321.

Brabham, M., "The Unusual Suspects", www.insidelectronics.com, Mar./Apr. 2000, pp. 15-16.

Ding, J. et al., "Aliasing-Free Space and Time Compactions with Limited Overhead", IEEE 2000 First International Symposium on Quality Electronic Design, Mar. 2000, pp. 355-360.

Dippe, M.Z., et al. "Antialiasing Through Stochastic Sampling," Department of Electrical Engineering and Computer Sciences, University of California, vol. 19, No. 3, Nov. 1985, pp. 69-78.

Ewins, J. et al., "Implementing an Anisotropic Texture Filter" Computers & Graphics 24 (2000), pp. 253-267.

Hart, J. et al., "Antialiased Parameterized Solid Texturing Simplified for Consumer-Level Hardware Implementation", Proceedings of the Eurographics/SIGGRAPH Workshop on Graphics Hardware, Los Angeles, California, Aug. 1999, pp. 45-53, 140.

Horita, K. et al., "Advanced Shallow Trench Isolation to Suppress the Inverse Narrow Channel Effects for 0.24μm Pitch Isolation and Beyond", Symposium on VLSI Technology, Digest of Technical Papers, Jun. 2000, pp. 178-179.

Igehy, H., "Tracing Ray Differentials", Computer Graphics, Proceedings, Annual Conference Series 1999, Siggraph 99, Conference Proceedings, Aug. 1999, pp. 179-186.

Jouppi, N. et al., "$Z^3$: An Economical Hardware Technique for High-Quality Antialiasing and Transparency", Proceedings of the Eurographics/SIGGRAPH Workshop on Graphics Hardware, Los Angeles, California, Aug. 1999, pp. 85-93, 143.

Keating, B., "Efficient Shadow Antialiasing Using an A-Buffer", Journal of Graphics Tools, vol. 4, No. 3, 1999, pp. 23-33.

Kiuchi, H. et al., "3.1.3 KSP Data-Acquisition System", Journal of the Communications Research Laboratory, vol. 46, No. 1, Mar. 1999, pp. 25-32.

Lee, J. et al., "SPARP: A Single Pass Antialiased Rasterization Processor", Computers & Graphics 24 (2000), pp. 233-243.

Mitchell, D. P., "Generating Antialiased Images at Low Sampling Densities", Computer Graphics, vol. 21, No. 4, Jul. 1987, pp. 65-72.

Mitchell, D. P., "Spectrally Optimal Sampling for Distribution Ray Tracing", Computer Graphics, vol. 25, No. 4, Jul. 1991, pp. 157-164.

Okumura, A. et al., "Parallel Programming with Layered Streams", Symposium on Logic Programming, IEEE, Aug. 1987, pp. 224-232.

Sauceda, A. et al., "Antialiasing Filter with High Pupil Apertures", 18th Congress of the International Commission for Optics: Optics for the Next Millennium, San Francisco, 1999, SPIE vol. 3749, p. 767.

Schilling, A., "A New Simple and Efficient Antialiasing with Subpixel Masks", Computer Graphics, vol. 25, No. 4, Jul. 1991, pp. 133-141.

Shahin, A. et al., "Cooperation of Fuzzy Segmentation Operators for Correction Aliasing Phenomenon in 3D color Doppler Imaging", Artificial Intelligence in Medicine, vol. 19, No. 2, Jun. 2000, pp. 121-154.

Spero, C. et al., "Corrosion Performance of Mild Steel in Coal Leachate", Materials Forum, vol. 12, Jan. 1988, pp. 73-78.

Waele, S.D. et al., "Error Measure for Resampled Irregular Data", IEEE Transactions on Instrumentation and Measurement, vol. 49, No. 2, Apr. 2000, pp. 216-222.

Wan, M. et al., "Interactive Stereoscopic Rendering of Voxel-based Terrain", Center for Visual Computing and Department of Computer Science State University of New York at Stony Brook, IEEE, Mar. 2000, pp. 197-206.

Yang, X. et al., "Scalable Wavelet Video Coding Using Aliasing-Reduced Hierarchical Motion Compensation", IEEE Transactions on Image Processing, vol. 9, No. 5, May 2000, pp. 778-791.

Zhang, H., "Forward Shadow Mapping", Proceedings of the Eurographics Workshop, Vienna, Austria, Jun. 1998, pp. 131-138, 330.

* cited by examiner

SYSTEM AND METHOD FOR MULTI-SAMPLING PRIMITIVES TO REDUCE ALIASING

CROSS-REFERENCE TO RELATED APPLICATIONS

This application is a continuation of U.S. patent application Ser. No. 11/417,387 filed May 3, 2006, which is a continuation of U.S. patent application Ser. No. 09/945,367 filed Aug. 31, 2001 and issued as U.S. Pat. No. 7,145,577 B2 on Dec. 5, 2006. These applications and patents are each incorporated herein by reference.

TECHNICAL FIELD

The present invention is related generally to the field of sampled imagery, and more particularly, to systems and methods for generating antialiased, sampled images.

BACKGROUND OF THE INVENTION

In computer graphics, a sampled image is created from input geometry or mathematical computations that typically represent a scene. The sampled two-dimensional (2D) image is represented by an array of discrete units referred to as pixels. The pixels are generally arranged along two perpendicular axes corresponding to the horizontal and vertical axes of the image. The color or monochrome values of the pixels are determined by calculated sample values, typically derived from scene data, lighting data, or other input data. The image represented by the array of pixels is typically transferred to a visual medium, such as by being printed onto paper or film, or displayed upon a computer display device. The number of pixels and number of colors or values used in rendering a graphics image limit, to some extent, the visual qualities and characteristics of the viewed image, for example, the image definition, smoothness, and detail. Consequently, a great amount of effort has been devoted to developing sophisticated graphics processing and rendering techniques for higher image quality.

In addition to high-quality static images, high-quality animation depicting visual effects of motion, is also desirable. The illusion of motion is created by quickly displaying related images in a sequence of image frames in which an object appears in different positions. Although the motion of the object may appear to be continuous, each frame of the animation is a separate image that is displayed momentarily. Thus, the quality of each frame will affect the quality of the animation or the illusion of motion. Depending upon the rendering algorithm, representing motion may result in the creation of motion artifacts. The more noticeable effects include static edge-effects such as "staircasing," as well as "crawling" and "popping" of pixels on an edge of a moving object having a value that contrasts against a background having a different value.

For example, consider an object having a straight edge and of a first color which appears to be moving across a background of a second color. As the edge of the object moves across a pixel, there must be a determination as to when the color of the pixel changes from the color of the background to the color of the object. If a single sample location within the pixel is taken to determine its color, then, when the edge of the object passes the single sampling location, the color of the pixel is changed. The location of a single sample location is typically located at the center of the pixel, and thus, the value of the pixel is determined by the value calculated for the center of the pixel. As a result of a single sample point determination, the edge of an object may extend well into the region represented by the pixel, but because the edge has not reached the center (i.e., the sample point) of the pixel, the pixel may continue to have the color of the background. As a result, when multiple images or frames are displayed in sequence to provide the illusion of objects in motion, pixels along the edge of an object may "pop" from one color or value to another. This effect can be distracting for a viewer. The relative motion of an object with respect to the orientation of the pixels of the image may be such that pixels along the edge of the object pop values in a manner and with a regularity that creates a visual effect of the edge of the object "crawling."

There have been many different approaches to addressing the issue of aliasing. One such approach is to increase the resolution, or the number of pixels used to represent an image. Although the available resolution of computer graphics displays and computer printing devices have reduced aliasing, there are practical limitations on the manufacture of displays and other devices used for forming or recording an image which will limit the maximum available resolution. Moreover, no matter how high a (finite) resolution is used to represent a graphics image, so long as the value of each pixel is only approximated from calculated values for discrete, sample points, within the pixel, the image is subject to some degree of aliasing, and a sequence of such images is subject to motion artifacts.

In another approach, aliasing can be "antialiased" to some degree by calculating multiple number of values in determining a final value for each pixel. That is, multi-sampling systems for antialiased rendering use sample values from multiple samples taken from a pixel region in determining the value of the respective pixel. For example, when multi-sampling is applied to the previous example, as the edge of the object passes the first of the sample locations in a pixel region, the pixel is given a value that is a compromise between the value of the object and the disparate value of the background. Where the size, shape and motion of the object result in the object gradually and completely covering the pixel, the value of the pixel will change each time the object covers another sample location until all of the sample points share the color of the object, at which time the pixel takes on the color of the object.

One approach to implementing the previously described antialiasing technique has been to shift the input geometry of the entire three-dimensional (3D) environment a sub-pixel distance for each of the sub-pixel sample locations and then repeat the entire rendering or rasterization process. In effect, the rendering process, from generating scene geometry through rasterizing the scene, is repeated for the calculation of each of the multiple samples. Although the resulting image is antialiased, this approach consumes considerable processing resources of a graphics processing system because multiple passes through the process of generating the scene geometry are needed. The time necessary to generate the multiple frames is a linear function of the number of desired samples, and as a result, no economy of scale performance gains would typically be realized. Moreover, the generating the geometry of the 3D environment multiple times necessitates either application driven generation of the frames, or an arbitrary amount of buffering within the graphics processing system to store the resulting data for an arbitrarily complex scene.

Therefore, there is a need for an alternative system and method for rendering an image from a representation of a scene, while reducing aliasing, such as motion artifacts and edge effects.

SUMMARY OF THE INVENTION

The present invention relates to a method and system for performing multi-sample, antialiased rendering of images by performing multi-sample antialiasing at the primitive level. Values for pixels of an image of an environment represented by geometric primitives are calculated by the system. Geometric data is used to represent the geometric primitives, which are set-up into a scene of the environment. A geometric primitive of the scene is shifted by a sub-pixel offset and rendered to generate values for pixels of an intermediate image. The shifting and rendering is repeated for the geometric primitive, each time with the values generated at the respective location stored to a buffer. The stored values for the pixels of the intermediate images are combined to produce values for the respective pixels of the resulting image.

DETAILED DESCRIPTION OF THE INVENTION

Embodiments of the present invention render antialiased images by reducing artifacts in both static images and also in motion pictures or animation. The systems and methods described herein perform antialiased rendering through a process of taking multiple samples, or "over-sampling" at the primitive or primitive set level for calculating the colors or values of pixels forming a resulting computer graphics image. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
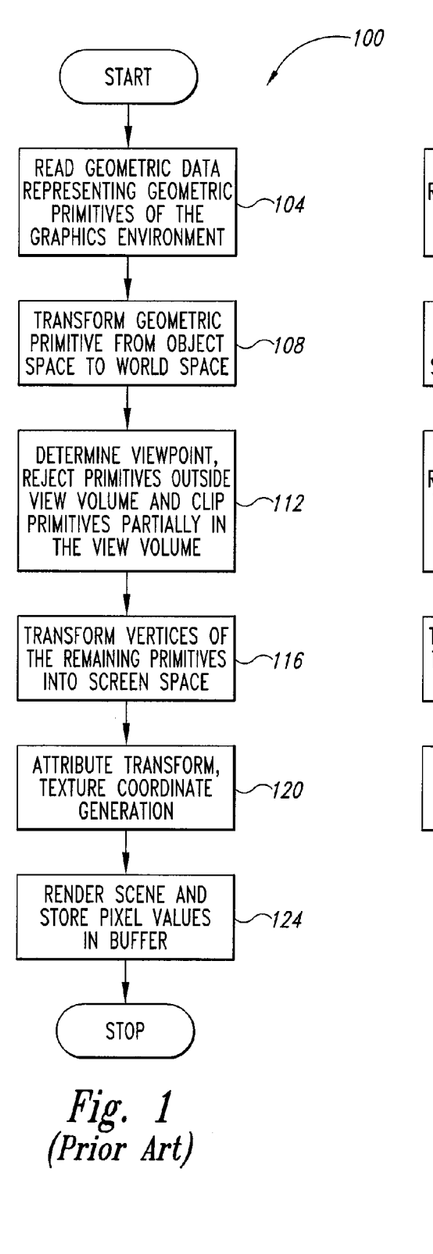
FIG. 1 is a flow diagram for conventional graphics pipelined processing.

Illustrated in FIG. 1 is a process flow diagram 100 of a conventional 3D graphics pipeline process. It will be appreciated that FIG. 1 does not necessarily represent a physical model of a graphics pipeline since the stages illustrated can be implemented in either software or hardware. Graphics information stored in a database is provided to the graphics pipeline (step 104) to begin construction of the 3D environment. The type of geometric data typically included in the database define vertices of geometric primitives having surfaces that are used construct the 3D objects, as well as attributes of the respective primitives, such as surface color, normal vector information, specular value, and the like. Along with the geometric data, environmental information is also stored. Environmental information includes such data as the number, color, and location of illumination sources, atmospheric properties, and the like.

The geometric data is typically provided to the graphics pipeline process in an object coordinate space and requires transformation into a world coordinate space (step 108). Various conventional transformation techniques are well known, and consequently, will not be discussed in detail herein. A viewpoint from which the 3D environment will be viewed is determined and a corresponding view volume is constructed. In order to ease the processing burden, the primitives located outside of the view volume are rejected, and the primitives that are partly inside the view volume are clipped (step 112). Thus, only the primitives contributing to the resulting image need to be processed through the graphics pipeline.

Following the primitive clipping process, the vertices of the of the primitives to be processed are transformed from the world space to a screen coordinate space corresponding to the 2D representation of the 3D environment. The attributes for the primitives, such as for the surface normal vector for the surface of a primitive, are transformed to the screen coordinate space as well (step 116). Additional steps to setup the primitives take place after the transformation to the screen space (step 120), such as texture application. A rasterization or rendering step is then performed which generates pixel attributes for each primitive (step 124). The pixel attribute data are typically written to a pixel buffer or frame buffer. The pixel attribute data stored in the buffer are then used for constructing a resulting 2D image of the scene. Although embodiments of the present invention will be described herein as being applied to 3D graphics, it will be appreciated that the present invention may be applied in performing antialiasing to 2D graphics as well.

As mentioned previously, conventional approaches to antialiasing have been to either shift the geometry of the 3D environment a sub-pixel distance for each sub-pixel sample locations, and repeat the entire graphics pipeline process for each of the samples, or render a frame multiple times with the pixel values written into separate buffers. For example, where four sub-pixel samples are calculated for the attributes of a pixel, several of steps 104-124 of FIG. 1 are repeated four times, each time with an entire frame shifted to a different sub-pixel position. The pixel attribute data resulting from each pass through the graphics pipeline process are written to a different pixel buffer, and then subsequently combined to determine final attributes of pixels for the final image of the scene. However, as also mentioned previously, the technique of rendering a frame multiple times consumes considerable processing resources of a graphics processing system because it requires four passes through the process of generating the scene geometry. The time necessary to generate the multiple frames is a linear function of the number of desired samples, and as a result, no economy of scale performance gains would typically be realized. Moreover, the generating the geometry of the 3D environment multiple times necessitates either application driven generation of the frames, or an arbitrary amount of buffering within the graphics processing system to store the resulting data for an arbitrarily complex scene.

In contrast to the conventional approach, embodiments of the present invention reduce the impact a multi-sample anti-aliasing operation has on processing overhead by performing multi-sampling at the primitive level. That is, rather than rendering an entire frame multiple times, it is the geometric primitives themselves that are rendered multiple times. As a result, only the drawing operation for each of the primitives is repeated for each of the sub-pixel samples, rather than repeating multiple passes through the process of generating the geometry for the multiple scenes. Additionally, cache mechanisms already operating within a graphics pipeline, for example, texture caching, permits rapid rendering of the multiple instances of the primitive.

Figure 2A:
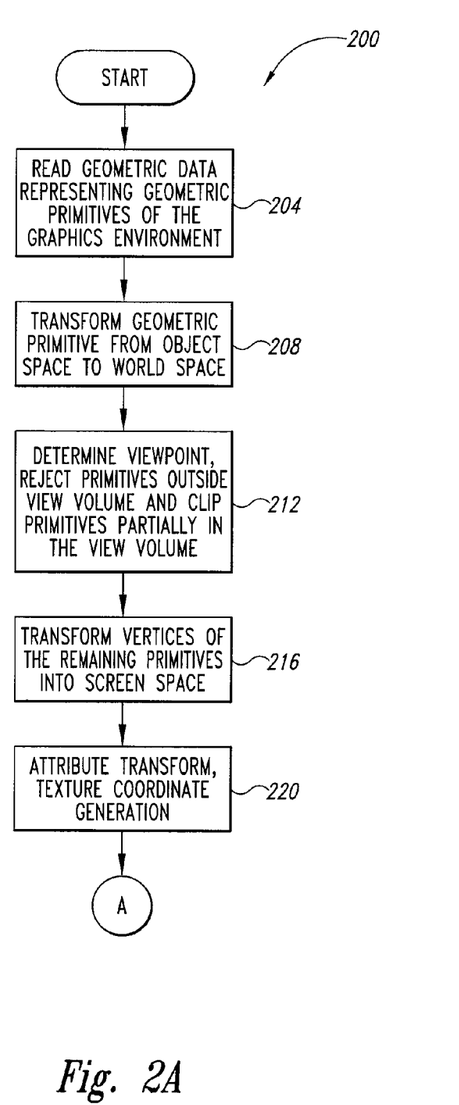
FIGS. 2a and 2b are a flow diagram for graphics processing according to aspects of the present invention.
Figure 2B:
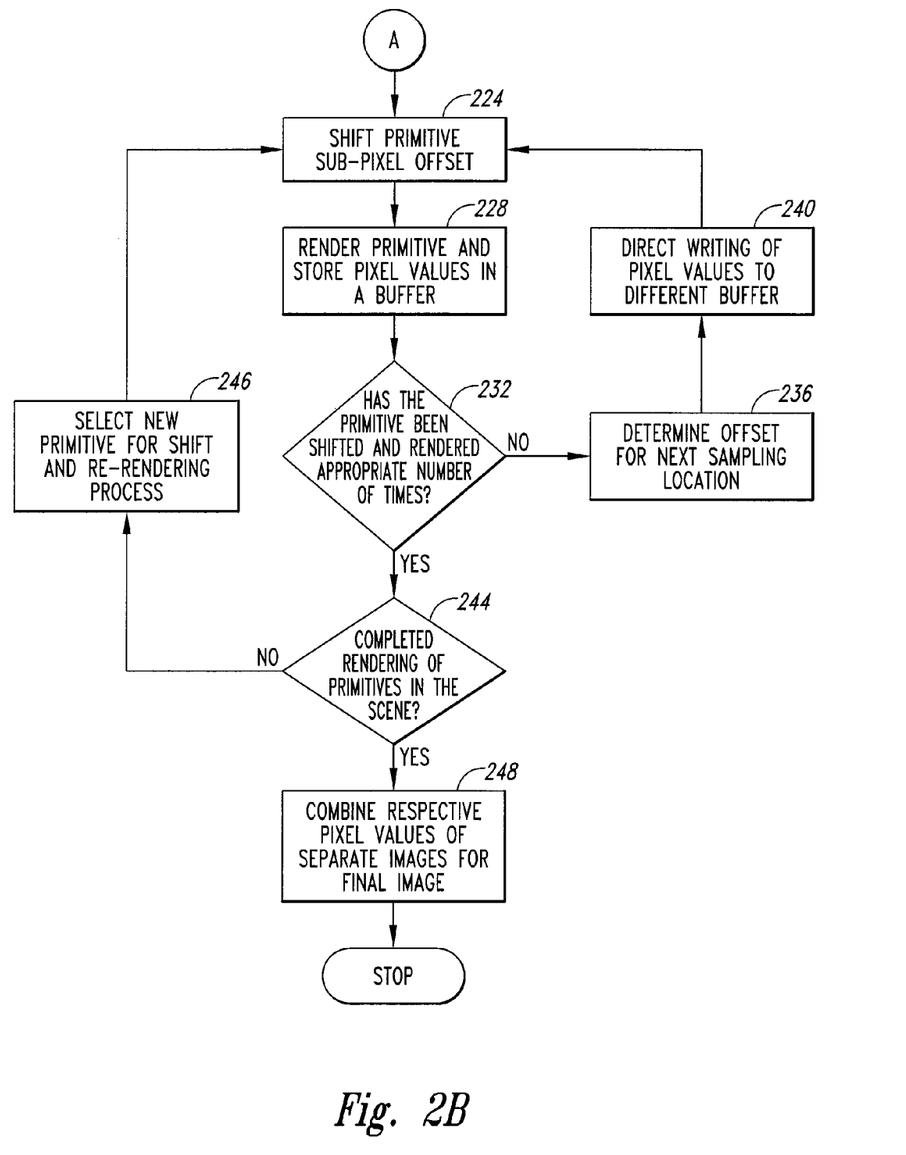

Illustrated in FIGS. 2a and 2b are a process flow diagram 200 of an embodiment of the present invention. It will be appreciated that the process flow 200 of FIGS. 2a and 2b is provided as an example to illustrate aspects of the present invention. Consequently, particular steps as described below may be removed or reorganized without departing from the scope of the present invention.

Steps 204-220 of the process flow are conventional and are similar to steps 104-120 of FIG. 1. However, at step 224, the primitive that is to be rasterized is shifted by a sub-pixel amount prior to rasterization (step 224). The primitive is shifted to a position corresponding to the location of one of the sub-pixel samples and then rasterized and the resulting sample values are written to a pixel buffer (step 228). The process of shifting the primitive, rasterizing and writing the resulting sample values to a buffer is repeated for each of the sub-pixel sample locations or until the appropriate number of samples are taken for a pixel (steps 232-240). The rasterization or rendering of the shifted primitive can be typically implemented using conventional circuitry and processing commands. For example, the triangle engine could be instructed to draw each primitive multiple times by reissuing a draw command, each time shifting one of the vertices of the primitive a sub-pixel offset plus a memory buffer offset, and then re-rendering the primitive. The shifting and rendering process is performed at the primitive level until all of the primitives of the scene are rendered (steps 244-246).

The sample values in the respective buffers are then combined to produce final values for pixels of the image (step 248). Many well-known conventional blending or combining techniques can be used for the present invention. In one embodiment, the sample values from each of the different buffers for a respective pixel are averaged together. That is, each of the sample values contribute equally to the final value of the pixel, such as in a simple box filter. In another embodiment, the sample values are weighted as a function of the respective offset distances from the center of the pixel. For example, sample values calculated at sub-pixel sample locations located at greater distances from the pixel center will contribute less to the final value of the pixel than those calculated at sample locations closer to the pixel center. For example, a Gaussian weighting function can be used.

In an alternative embodiment, sets of primitives, such as a tristrip, are re-rendered instead of an individual primitive. It will be appreciated that other known collections of geometric primitives can be used as well without departing from the scope of the present invention, such as triangle fans, sets of disjoint triangles, and the like. In the embodiment where the set of primitives is a tristrip, the tristrip definition should be buffered so that it may be reissued multiple times. However, it may be the case that the buffers of the graphics pipeline is insufficient to buffer enough geometric state for more than only a few triangles. Thus, consideration of the available pipeline resources should be considered when implementing this embodiment.

In alternative embodiments of the present invention, the use of rendering buffers can be economized. For example, with some loss of sampling accuracy, n instances of pixel color buffers and one z-buffer could be utilized. That is, for the n−1 issues of the primitive, writing to the z-buffer is inhibited. However, the nth issue of the primitive is rendered with the z-buffer inhibit removed. Thus, only one z-buffer is required for implementing the present invention. It will be appreciated that embodiments of the present invention may be implemented using other buffers whose state affects the rendering process, and which can be modified as part of the rendering process.

Figure 3:
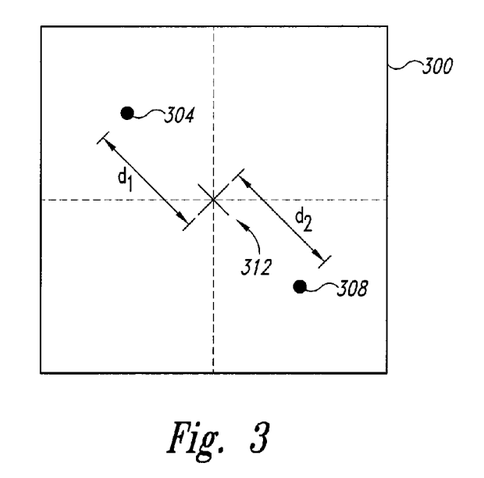
FIG. 3 is a diagram of a multi-sample pattern according to another embodiment of the present invention.

FIG. 3 illustrates an example of a sampling pattern 300 that can be used in embodiments of the present invention. A pixel region 300 is shown with sampling locations 304 and 308.

The pixel region 300 represents the region that a pixel of the resulting image covers. As shown in FIG. 3, the pixel region 300 is dividend into four equal sub-regions. The sampling locations 304 and 308 are positioned at the center of the upper-left sub-region and the lower-right sub-region. Note that the sampling locations 304 and 308 are offset from a center 312 of the pixel region 300 by sub-pixel offsets $d_1$ and $d_2$, respectively. Shifting a geometric primitive by the offset $d_1$ will effectively result in a sample being calculated at the sampling location 304. Similarly, shifting the geometric primitive by the offset $d_2$ will effectively result in a sample being calculated at the sampling location 308. Thus, by shifting the geometric primitive by the respective offsets, multiple samples for a pixel may be calculated and then used for antialiasing.

The sampling pattern 300 may be repeated for each of the pixels during the rendering of the primitive by selecting offsets that shift the primitive to a location that corresponds to the sampling locations of the sampling pattern 300. Alternatively, the sampling pattern 300 can be used as a basis from which dynamic offsets could be determined stochastically to implement "jittered" antialiasing. Both embodiments can be implemented using well-known conventional techniques. Further examples of the different types of sampling patterns and techniques are described in more detail in co-pending U.S. patent application Ser. No. 09/823,935, entitled MULTI-SAMPLE METHOD AND SYSTEM FOR RENDERING ANTIALIASED IMAGES, to Peterson et al., filed Mar. 30, 2001, which is incorporated herein by reference. It will be appreciated, however, that many different sampling patterns could be used in embodiments of the present invention in addition to those described herein and in the aforementioned co-pending patent application. Therefore, the scope of the present invention should not be limited by the particular sampling pattern employed, except to the extent the limitation is recited in one of the claims attached hereto.

Figure 4:
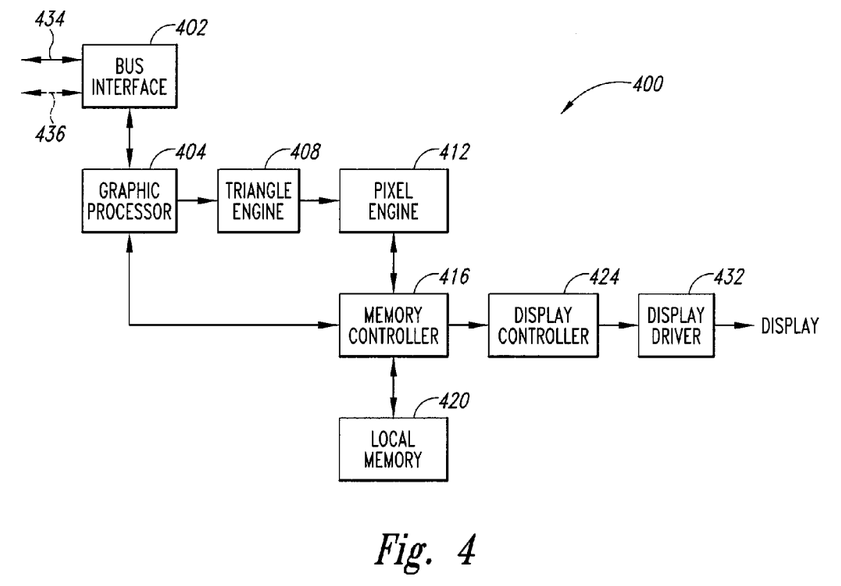
FIG. 4 is a block diagram of a graphics processing system according to an embodiment of the present invention.

FIG. 4 illustrates circuitry included within the graphics processing system 400 for performing various graphics and video functions, including antialiasing according to embodiments of the present invention. In the following description, the various stages of the graphics processing system 400 will be described as performing various functions and graphics processes. However, the various functions and graphics processes may also be performed by or associated with a different stage than described herein. Consequently, it will be appreciated that the particular embodiment of the graphics processing system 400 is provided merely as an example, and is not intended to limit the scope of the present invention.

As shown in FIG. 4, a bus interface 402 couples the graphics processing system 400 to the expansion bus 434 or optionally a high-speed bus 436. In the case where the graphics processing system 400 is coupled through the high-speed data bus 436, the bus interface 402 will include a DMA controller (not shown) to coordinate transfer of data to and from the graphics processing system 400. A graphics processor 404 is coupled to the bus interface 402 and is designed to perform various graphics and video processing functions, such as, but not limited to, generating vertex data and performing vertex transformations for polygon graphics primitives that are used to model 3D objects. The graphics processor 404 is coupled to a triangle engine 408 that includes circuitry for performing various graphics functions, such as attribute transformations, rendering of graphics primitives, and generating texture coordinates for a texture map. The circuitry of the triangle engine 408 can also be used to perform antialiasing in accordance with embodiments of the present invention by over-sampling within the pixels of the graphics image to reduce aliasing artifacts.

A pixel engine 412 is coupled to receive the graphics data generated by the triangle engine 408. The pixel engine 412 contains circuitry for performing various graphics functions, such as, but not limited to, texture application or mapping, bilinear filtering, fog, blending, and color space conversion. A memory controller 416 coupled to the pixel engine 412 and the graphics processor 404 handles memory requests to and from a local memory 420. The local memory 420 stores graphics data, such as pixel values. A display controller 424 is coupled to the memory controller 416 to receive processed values for pixels that are to be displayed. The output values from the display controller 424 are subsequently provided to a display driver 432 that includes circuitry to provide digital signals, or convert digital signals to analog signals, to drive a display device (not shown).

It will be appreciated that additional processes and circuitry that have not been shown or described with respect to FIG. 4 may also be included in the graphics processing system 400. For example, various data buffers used throughout the graphics processing operation, such as a pixel buffer, a z-buffer, and stencil buffer, are included in the different functional blocks of the graphics processing system 400. However, they have not been discussed in detail in order to avoid unnecessarily obscuring the invention. It will be further appreciated that the circuitry included in the functional blocks of the graphics processing system 400 are conventional in design and are well understood by those of ordinary skill in the art. Consequently, the description provided herein is sufficient to enable the same to practice embodiments of the present invention.

As previously mentioned, the graphics processing system 400 facilitates antialiasing by over-sampling for at least some pixels of a graphics image. The sample values for the multiple samples for a pixel are calculated for each triangle, or other primitive, covering, or partially covering, the pixel. Calculation of the multiple sample values occurs at the primitive or primitive set level to avoid repeating many of the processing intensive steps of generating the geometry of the 3D environment. Each primitive is shifted by a sub-pixel offset and rasterized for the multiple samples. The sample value for a given sample position within a given pixel may be then stored or altered, for example, by well-known z-buffer techniques, in accordance with the processing of other data, such as other primitives touching the same sample position in the same pixel. In one embodiment, the final sample values for a given pixel are subsequently combined in the pixel engine 412 or texture engine (not shown) or blend unit (not shown), to determine a sample value for the pixel in the resulting image.

Although the antialiasing operation has been described as being implemented in the triangle engine 408, it will be appreciated that the antialiasing operation may also be implemented in circuitry that is separate from the triangle engine 408, or included in one of the aforementioned circuit blocks of the graphics processing system 400, such as the pixel engine 412. Alternatively, the antialiasing operation may be divided and carried out by various circuit blocks of the graphics processing system 400. For example, portions of the antialiasing operation may be shared between the triangle engine 408 and the pixel engine 412. That is, when geometric primitives are rendered by the triangle engine 408, sample values are calculated for each sample point, typically of each pixel having a portion covered by the geometric primitive. Once the over-sampling is performed, the pixels may be further processed, for example, for depth, texture, and the like, and then the pixel engine 412 may perform the down-sampling or combining of the multiple sample values. Therefore, the particular implementation of the antialiasing circuitry 414 is a detail that may be modified without deviating from the subject matter of the invention, and should not be used in limiting the scope of the present invention. Moreover, embodiments of the present invention may be implemented in software or hardware, or a combination thereof. Those of ordinary skill in the art have sufficient understanding to implement the present invention as such.

It will be appreciated that the sample values discussed herein may represent values such as color values, grayscale values, depth values, and the like, at a sample location. It will be further appreciated that the sample values for the samples may consist of several different components. For example, a sample value may represent not only a pixel color, as a combination of red, green, and blue color components, but also a depth value. Another example includes sample values representing pixel colors which are combinations of luma and chroma components. Consequently, because it is well understood in the art, although circuitry to perform graphics operation for each of the components is not expressly shown or described herein, embodiments of the present invention include circuitry, control signals, and the like necessary to perform operations on each component for multi-component sample values.

Figure 5:
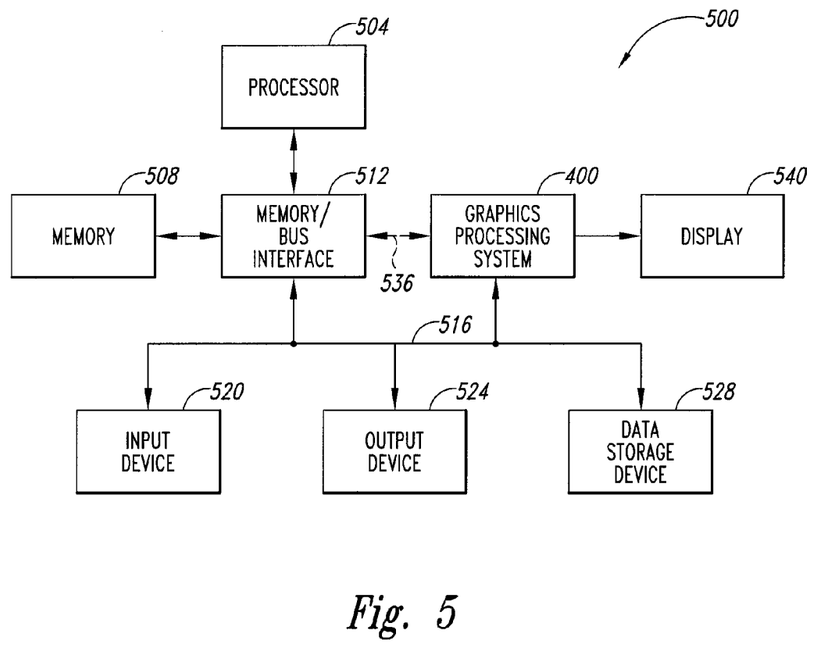
FIG. 5 is a block diagram of a computer system including the graphics processing system of FIG. 4.

FIG. 5 illustrates a computer system 500 in which embodiments of the present invention are implemented. The computer system 500 includes a processor 504 coupled to a memory 508 through a memory/bus interface 512. The memory/bus interface 512 is coupled to an expansion bus 516, such as an industry standard architecture (ISA) bus or a peripheral component interconnect (PCI) bus. The computer system 500 also includes one or more input devices 520, such as a keypad or a mouse, coupled to the processor 504 through the expansion bus 516 and the memory/bus interface 512. The input devices 520 allow an operator or an electronic device to input data to the computer system 500. One or more output devices 524 are coupled to the processor 504 to receive output data generated by the processor 504. The output devices 524 are coupled to the processor 504 through the expansion bus 516 and memory/bus interface 512. Examples of output devices 524 include printers and a sound card driving audio speakers. One or more data storage devices 528 are coupled to the processor 504 through the memory/bus interface 512 and the expansion bus 516 to store data in, or retrieve data from, storage media (not shown). Examples of storage devices 528 and storage media include fixed disk drives, floppy disk drives, tape cassettes and compact-disc read-only memory drives.

The computer system 500 further includes the graphics processing system 400 (FIG. 4) coupled to the processor 504 through the expansion bus 516 and memory/bus interface 512. Optionally, the graphics processing system 400 may be coupled to the processor 504 and the memory 508 through other types of architectures. For example, the graphics processing system 400 may be coupled through the memory/bus interface 512 and a high speed bus 536, such as an accelerated graphics port (AGP), to provide the graphics processing system 400 with direct memory access (DMA) to the memory 508. That is, the high speed bus 536 and memory bus interface 512 allow the graphics processing system 400 to read and write memory 508 without the intervention of the processor 504. Thus, data may be transferred to, and from, the memory 508 at transfer rates much greater than over the expansion bus 516. A display 540 is coupled to the graphics processing system 400 to display graphics images. The display 540 may be any type of display, such as those commonly used for desktop computers, portable computers, and workstations, for example, a cathode ray tube (CRT), a field emission display (FED), a liquid crystal display (LCD), or the like.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for calculating pixel values, the method comprising:
    clipping geometric primitives that are partially within a predetermined viewport;
    transforming clipped geometric primitives from a first coordinate space to a second coordinate space; and
    for each transformed primitive:
        shifting the transformed primitive in the second coordinate space by a respective first sub-pixel offset,
        rendering the first shifted transformed primitive to generate at least one first sample value for a pixel,
        shifting the second transformed primitive in the second coordinate space by a respective second sub-pixel offset,
        rendering the shifted transformed primitive to generate at least one second sample value for the pixel,
        writing the first sample value to a first buffer and writing the second sample value to a second buffer, and
        combining the first and second sample values to generate a pixel value for the pixel.

2. The method of claim 1 wherein either the first or second buffer comprises a z-buffer.

3. The method of claim 1 wherein at least one of the plurality of geometric primitives comprises a strip of connected triangles.

4. The method of claim 1 wherein at least one of the plurality of geometric primitives comprises a fan shaped set of connected triangles.

5. The method of claim 1 wherein at least one of the plurality of geometric primitives comprises a set of disjoint triangles.

6. The method of claim 1 wherein shifting each of the plurality of transformed primitives by the respective first sub-pixel offset comprises shifting each of the plurality of transformed primitives to a respective sub-pixel location corresponding to a first sampling location of a sampling pattern.

7. The method of claim 1 wherein combining the first and second sample values comprises averaging the values for the respective first and second sets of pixels for each of the plurality of transformed primitives.

8. The method of claim 1 wherein combining the first and second sample values comprises weighting the values for the respective first and second samples as a function of respective offsets and combining the weighted values.

9. A graphics system for calculating pixel values, the system comprising:
    a processor operable to include:
        a set-up engine configured to receive geometric data, clip geometric data that is partially within a predetermined viewport, and generate transformed geometric data therefrom, the transformed geometric data representing a plurality of geometric primitives in a new coordinate space, and
        a rendering stage coupled to the set-up engine and configured to receive the transformed geometric data for at least one geometric primitive, the rendering stage configured to shift the geometric primitive a respective first sub-pixel offset from a first pixel position and calculate a first sample value for a pixel at least partially covered by the geometric primitive, and further configured to shift the geometric primitive a second respective sub-pixel offset from the first pixel position and calculate a second sample value for the pixel, and further configured to combine the first and second sample values to generate a pixel value; and
    a buffer coupled to the rendering stage and configured to store the pixel value.

10. The graphics system of claim 9 wherein the rendering stage is further configured to shift the geometric primitive to additional sub-pixel offsets and calculate at least one respective sample value for each location of a sampling pattern.

11. The graphics system of claim 10, further comprising additional buffers, each configured to store at least one of the respective sample values, and the number of which is equal to one less than the number of sampling locations.

12. The graphics system of claim 11, further comprising a combining circuit coupled to the additional buffers and configured to combine the sample values to generate the pixel value.

13. The graphics system of claim 12 wherein the combining circuit is further configured to average the respective sample values.

14. The graphics system of claim 12 wherein the combining circuit is further configured to weight the respective sample values as a function of the respective sub-pixel offsets and combine the weighted values.

15. The graphics system of claim 9 wherein the rendering stage includes a primitive buffer for storing transformed geometric data and the geometric primitive comprises a strip of connected triangles.

16. The graphics system of claim 9 wherein the rendering stage includes a primitive buffer for storing transformed geometric data and the geometric primitive comprises a fan shaped set of connected triangles.

17. The graphics system of claim 9 wherein the rendering stage includes a primitive buffer for storing transformed geometric data and the geometric primitive comprises a set of disjoint triangles.

18. A method for determining values for pixels of an image, the method comprising:
    in a graphics processing system, clipping a geometric primitive that is partially within a predetermined viewport;
    shifting a position of a geometric primitive in a screen coordinate space from a first pixel position to positions corresponding to respective sampling locations of a sampling pattern, the sampling locations being a respective sub-pixel offset from the first pixel position;
    rendering in the graphics processing system the shifted geometric primitive positioned at each of the sampling locations to generate sample values for a respective set of pixels representing the shifted geometric primitive positioned at the each of the plurality of sampling locations; and
    calculating values for a resultant set of pixels representing the rendered geometric primitive positioned at the first pixel position with the sample values for the respective sets of pixels generated for the geometric primitive positioned at the plurality of sampling locations of the sampling pattern.

19. The method of claim 18, further comprising writing the sample values for each respective set of pixels generated for the geometric primitive positioned at one of the plurality of sampling locations to a respective buffer.

20. The method of claim 19 wherein writing to a respective buffer comprises writing to a z-buffer after writing to a plurality of pixel color buffers.

21. The method of claim 18 wherein the geometric primitive comprises a strip of connected triangles, a fan-shaped set of connected triangles, or a set of disjoint triangles.

22. The method of claim 18 wherein calculating values for a resultant set of pixels representing the rendered geometric primitive positioned at the first pixel position with the sample values for the respective sets of pixels generated for the geometric primitive positioned at the plurality of sampling locations comprises averaging the sample values for the respective sets of pixels.

23. The method of claim 18 wherein calculating values for a resultant set of pixels representing the rendered geometric primitive positioned at the first pixel position with the sample values for the respective sets of pixels generated for the geometric primitive positioned at the plurality of sampling locations comprises weighting the sample values for the respective sets of pixels as a function of the respective sampling locations and combining the weighted sample values.

* * * * *